United States Patent [19]

Ingram, II et al.

[11] Patent Number: 4,927,092
[45] Date of Patent: May 22, 1990

[54] TAPE MEASURE LOCKING SYSTEM

[75] Inventors: Billy S. Ingram, II, Asheville; David S. Chapin, Raleigh, both of N.C.

[73] Assignee: Cooper Industries, Inc., Houston, Tex.

[21] Appl. No.: 213,735

[22] Filed: Jun. 30, 1988

[51] Int. Cl.⁵ .......................... G01B 3/10; B65H 75/30
[52] U.S. Cl. ..................................... 242/107.2; 33/767
[58] Field of Search ............... 242/107.2, 107.3, 107.6, 242/107.7; 33/138, 767, 768, 769

[56] References Cited

U.S. PATENT DOCUMENTS

| | | | |
|---|---|---|---|
| 2,599,320 | 6/1952 | Dart | 242/107.3 |
| 2,604,274 | 7/1952 | Loquens | 242/107.2 |
| 3,430,348 | 3/1969 | Quenot | 242/107.3 X |
| 3,435,529 | 4/1969 | Quenot | 242/107.2 X |
| 3,443,316 | 5/1969 | Edgell | 242/107.3 X |
| 3,450,367 | 6/1969 | Edgell | 242/107.2 |
| 3,578,259 | 5/1971 | Zelnick | 242/107.6 X |

FOREIGN PATENT DOCUMENTS

| | | | |
|---|---|---|---|
| 1145803 | 3/1963 | Fed. Rep. of Germany ... | 242/107.2 |
| 45/21034 | 3/1966 | Japan ...................................... | 33/138 |
| 1275729 | 5/1972 | United Kingdom ................. | 33/138 |

*Primary Examiner*—Katherine A. Matecki
*Attorney, Agent, or Firm*—Eddie E. Scott; Alan R. Thiele; Nelson A. Blish

[57] ABSTRACT

A locking system for a tape measure includes a locking pad located inside the case in which the coiled tape measure is contained. As the tape is dispensed from its case, the locking pad locks the tape against the inside of the housing. When it is desired to unlock the tape, a force from the side of the tape housing causes the locking pad to lift out of its position in contact with the tape. The tape is then recoiled into the housing.

8 Claims, 3 Drawing Sheets

TAPE MEASURE LOCKING SYSTEM

BACKGROUND OF THE INVENTION

The present invention relates to coiled measuring tape rules, more particularly the present invention relates to locking mechanisms for coiled measuring tape rules.

Coiled measuring tape rules are a standard item in the tool boxes of many carpenters, mechanics and artisians. Such coiled measuring tape rules are most conveniently utilized when they can be selectively locked in their uncoiled or extended configuration. Various locking mechanisms have been advanced for use with coiled taped measuring tape rules. These locking mechanisms may be divided into two categories; ones that are always locked and ones that can be locked and unlocked. Those that are always locked can lock by direct contact with the tape blade or by contact with the tape reel. This latter type is the least desirable as tape blades may shift once locked. Some currently manufactured tapes lock both against the tape reel and the tape blade. Herein the problem of tape movement is solved by the addition of a tape blade lock. Such tape blade lock is not strong enough to prevent the tape from moving if the lock against the tape reel is not engaged.

Exemplary of one type of locking mechanism is the system shown in U.S. Pat. No. 3,578,259 wherein a push button is located on the edge of the housing. When the tape is extended, one side of the button is pushed and the tape is locked in position. When it is desired to release the tape from its extended or uncoiled position, the opposite side of the button is pushed and the tape is allowed to recoil. Such prior art locking mechanisms, while utilitarian, are somewhat difficult to operate in that the user must first remember to lock the tape in its extended position. When finished, the user must then shift his hand grip on the tape housing to press the release side of the button thus allowing the coiled tape rule to return to its coiled configuration within the tape housing.

There is therefore a need in the art to provide an easy to use coiled tape measure rule incorporating a locking system wherein the tape portion is locked in its extended position whenever tape is dispensed from the tape measure housing. Such locking system should also provide for unlocking of the tape without changing the user's hand grip on the tape measure housing. Preferably such locking system should be de-activated by a button located on the side of the housing.

SUMMARY OF THE INVENTION

A simple, easy to use system for locking and unlocking a coiled tape rule from an extended position is provided by the present invention. The tape is automatically locked in its extended position as it is dispensed from the housing and unlocked from its extended position by other squeezing the housing or activating a button located on the side of the housing. Accordingly, the tape locking system of the present invention does not require a change of the user's hand grip.

As the measuring tape is dispensed or uncoiled from the tape measure housing an internally mounted pad is positioned so that it rides on the top surface of the tape as it exits the housing. When the desired length of the tape has been dispensed from the housing, the pressure exerted by the locking pad on the tape against the housing automatically causes the uncoiled tape to remain in its extended position. This automatic locking is accomplished by the biasing of the locking pad into frictional contact with the top surface of the tape such that the bottom surface of the tape is pressed against the inside of the housing. When the user desires to recoil the tape into the housing, the locking force is released by either squeezing the housing or activating a button on the side of the housing. This causes the locking pad to be moved away from the top surface of the tape. The recoiling mechanism may then retract the tape into the housing.

BRIEF DESCRIPTION OF THE DRAWINGS

A better understanding of the tape locking mechanism of the present invention may be had by reference to the figures wherein.

BRIEF DESCRIPTION OF THE EMBODIMENTS

Figure 1:
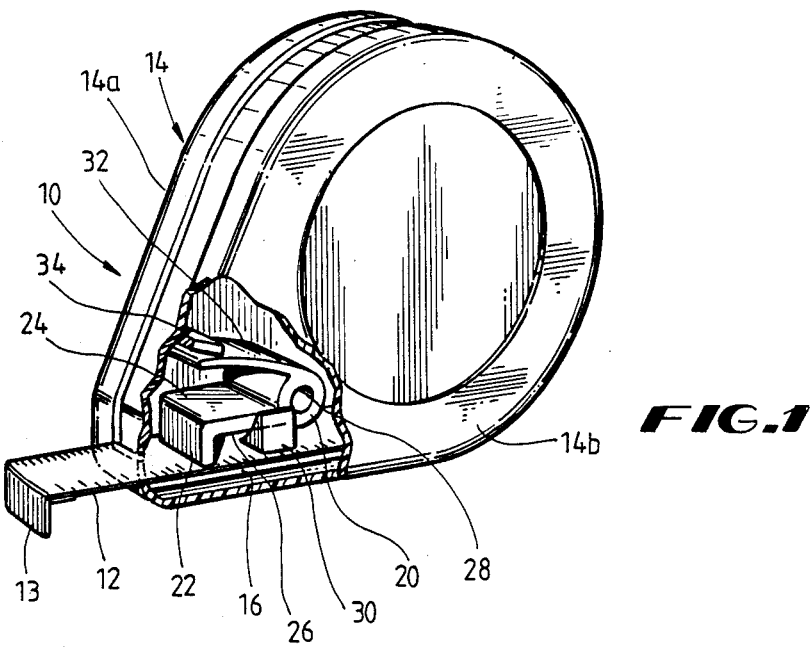
FIG. 1 is a perspective view of a tape measure with a portion broken away to show the preferred embodiment of tape locking mechanism of the present invention in its locked position.
Figure 2:
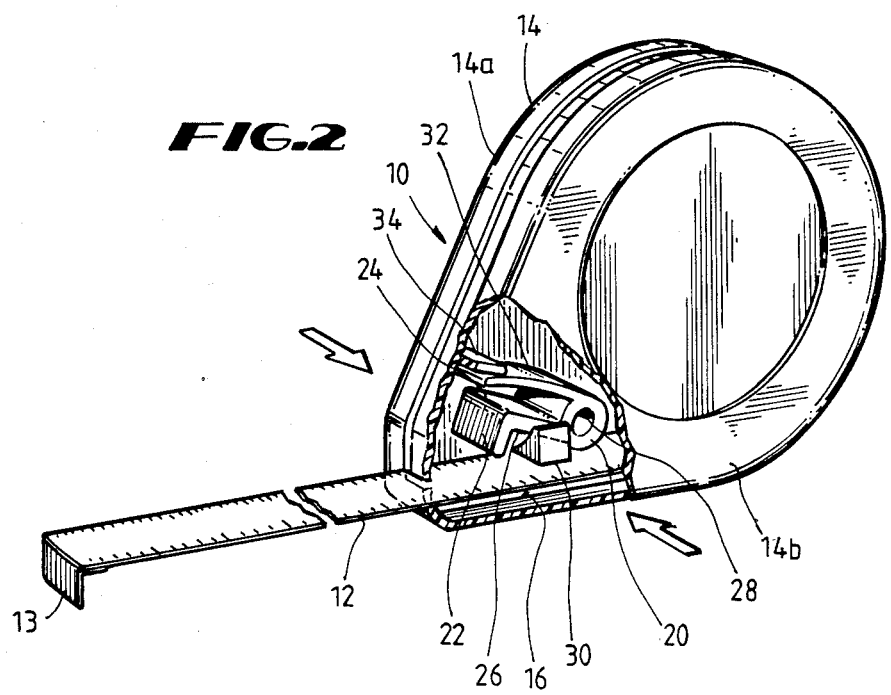
FIG. 2 is a view similar to FIG. 1 with the locking mechanism in its tape release position.
Figure 3:
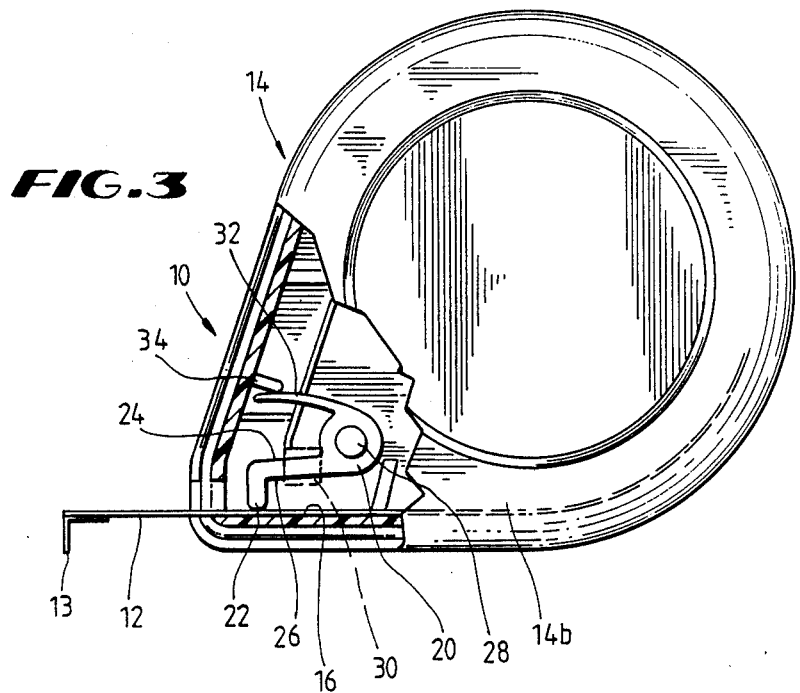
FIG. 3 is a side elevational view of the tap measure shown in FIG. 1 with a portion broken away to show the locking mechanism.
Figure 4:
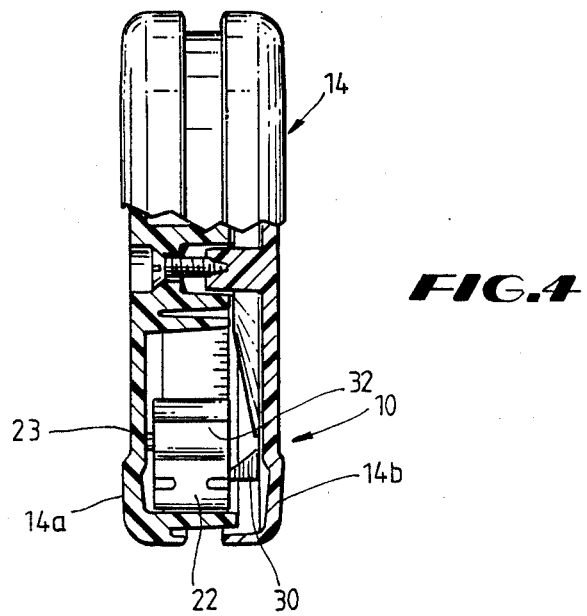
FIG. 4 is a front elevational view of the tape measure shown in FIG. 1 with a portion broken away to show the locking mechanism.

As may be seen by reference to FIGS. 1 through 4, the preferred embodiment of tape measure locking system 10 of the present invention consists of a single locking piece 20 which is positioned to ride on the top surface of tape measure 12 as it exits tape measure housing 14. Locking piece 20 has foot 22 which contacts the top side of tape 12. Foot 22 presses tape 12 against inside 16 of housing 14 and thus causes it to remain in an extended position as it leaves housing 14. Without such locking system it would be necessary to catch end hook 13 on the edge of a piece being measured or to physically hold tape 12 itself.

Attached to foot 22 is arm 24 which includes cam surface 26. The purpose of cam surface 26 will be explained in the operation of the tape measure locking system 10. Arm 24 terminates in pivot point 28. Pivot point 28 is a hole formed at the end of arm 24. Hole 28 fits over a peg or axle 23 (FIG. 4) whereby arm 24 and foot 22 are allowed to pivot. Biasing foot 22 into contact with the top side of tape 12 is biasing arm 32. Biasing arm 32 is kept in position by biasing peg 34 which is located on the inside of housing 14. The bias placed on biasing arm 32 by biasing peg 34 causes foot 22 to press against tape 12. This contact of foot 22 with tape 12 creates a downward mechanical force against tape 12. This downward mechanical force pushes tape 12 against the inside 16 of housing 14 with sufficient force to keep tape 12 in position after it has been uncoiled. Foot 22 is moved out of contact with tape 12 by the movement of wedge shaped protuberance 30 into engagement with cam surface 26. Continuing the movement of wedge shaped protuberance 30 with respect to cam surface 36 causes foot 22 to move away from the top surface of tape 12. The bias of biasing arm 32 is thus defeated. Accordingly, tape 12 is no longer locked in an extended position.

In the alternative embodiments shown in FIGS. 5 through 8 parts having similar functions to those in the preferred embodiment have three digit reference numbers wherein the last two digits are the same as the reference numbers describing the preferred embodiment.

Figure 5:
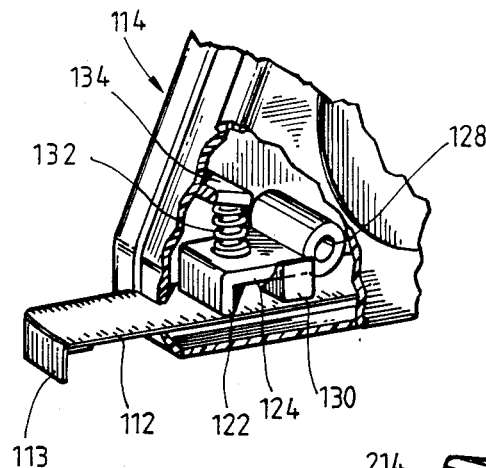
FIG. 5 is a first alternate embodiment of the locking mechanism.

As may be seen in FIG. 5 biasing arm 32 of the preferred embodiment is replaced by a coiled spring 132.

While one wedge shaped protuberance is shown on the inside of housing 14 in the preferred embodiment it will be understood that either one or two protuberances 130 may be used, one on each side of the housing 114.

Figure 6:
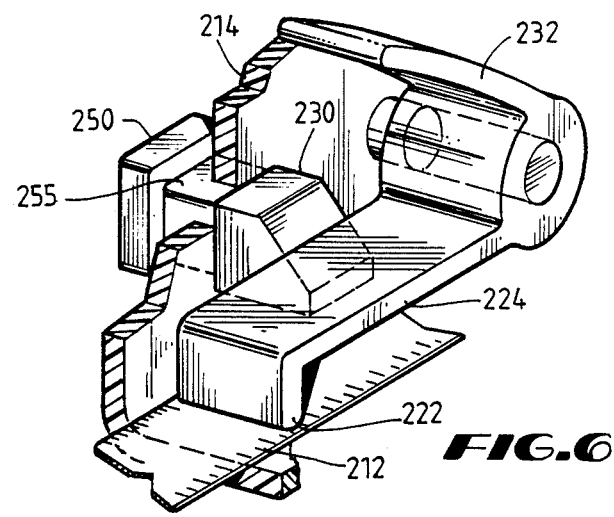
FIG. 6 is a second alternate embodiment of the locking mechanism.
Figure 7:
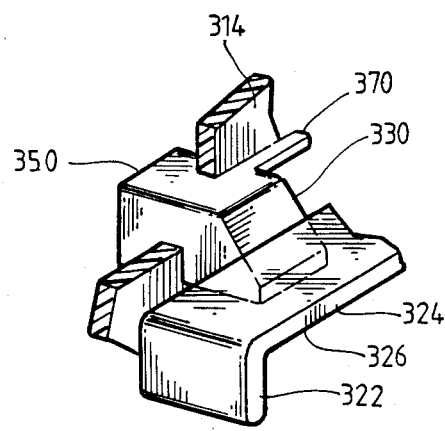
FIG. 7 is a third alternate embodiment of the locking mechanism.

In FIGS. 6 and 7 it may be seen that protuberances 230 and 330 may be activated by buttons 250 and 350 respectively positioned on the outside of housings 214 and 314 respectively.

Figure 8:
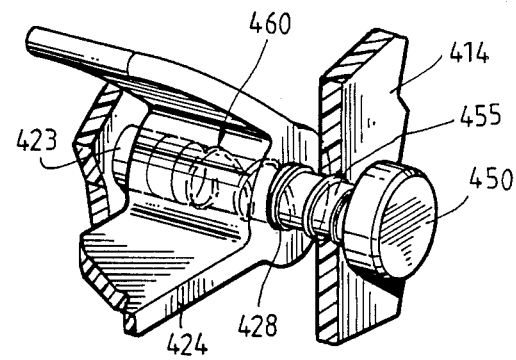
FIG. 8 is a fourth alternate embodiment of the locking mechanism.

In FIG. 8 it may be seen in yet another embodiment that the bias from arm 432 may be defeated by the interaction of male and female helical threads 460 located at pivot hole 428. The pushing of button 450 causes arm 424 to rotate upward.

OPERATION

The user of a tape measure having the tape locking system 10 of the present invention begins by pulling tape 12 from case 14. In doing so, the user overcomes a spring bias (not shown) located within housing 14 which urges tape 12 into its coiled shape. End hook 13 prevents tape 12 from being fully retracted into housing 14. After tape 12 has been extended out of housing 14 it is necessary to lock tape 12 in its extended position. This locking is accomplished by the action of pressure foot 22 which exerts pressure on tape 12 and pushes tape 12 against inside 16 of housing 14. The force on pressure foot 22 caused by the engagement of bias arm 32 under biasing peg 34 is sufficient to defeat the spring bias which urges the tape into its recoiled shape.

In the preferred embodiment shown in FIGS. 1 through 4, sides 14a and 14b of housing 14 are pushed together to defeat the bias on pressure foot 22. This pushing together of sides 14a and 14b of housing 14 causes wedge shaped protuberance 30 on the inside of wall 14a to engage and move cam surface 26. Simple flexing of sides 14a and 14b is sufficient to provide adequate movement of protuberance 30. If desired sides 14a and 14b may be hingedly attached to one another along back edge 15 and kept apart by an internal spring bias. If such system is used one housing section should be constructed to fit within the other housing section. The movement of cam surface 26 by protuberance 30 causes pressure foot 22 to lift from the top side of tape 12. Accordingly, tape 12 is now free to be recoiled into housing 14 by the spring bias. The resilience of housing 14 returns it to its configuration before sides 14a and 14b are pressed inward. If desired two protuberances 30 may be used, one opposite the other to act against cam surface 26.

In the embodiment shown in FIG. 5 protuberance 130 acting against cam surface 126 defeats the bias of coiled spring 132.

In the embodiment shown in FIG. 6 the bias from arm 232 acts against protuberance 230 and shaft 255 to restore button 250 to its outermost position after foot 222 has been lifted from the top surface of tape 212.

In the embodiment shown in FIG. 7 protuberance 330 is hingedly 370 attached to housing 314 so that button 350 is restored to its outermost position by the interaction of the bias from hinged attachment 370 and the bias on cam surface 326.

In the embodiment shown in FIG. 8 a helical screw path 460 is formed within pivot 428 and on the shank position 455 of button 450. When button 450 is pushed inward arm 424 rotates upward to release the pressure from the top of the tape.

Foot 22, arm 24, pivot 28 and biasing arm 32 and the counterparts thereof in the alternate embodiments may be formed as single or multiple units from plastic or metallic materials or a combination thereof. Such materials should have resilience, memory and rigidity properties sufficient to enable operation of locking system 10 or the counterpart systems shown in the alternate embodiments.

There is thereby provided by the tape measure locking system 10 of the present invention a convenient, easy to use method for automatically locking a tape measure in its extended position and releasing the lock when the measurement has been completed.

The tape measure locking system 10 of the present invention now having been described by reference to the foregoing specification will suggest still further embodiments to those of ordinary skill in the art. Such other embodiments shall fall within the scope of the appended claims.

What is claimed is:

1. A locking system for a coiled tape measure contained within a hollow flexible case having parallel sides separated by a wall comprising:
    means for pressing said tape measure outwardly against the inside of the case wall;
    means for biasing said means for pressing said tape outwardly against the inside of the case wall;
    means for defeating said means for biasing, said means for defeating said means for biasing being activated by an inward force from one of the parallel sides of the coiled tape measure case;
    wherein said means for defeating said means for biasing comprises at least one wedge member attached to the inside of said case, said wedge member being constructed and arranged to engage and lift said means for pressing said tape against the inside wall of the case.

2. The locking system as defined in claim 1 further including a button connected to a shaft which passes through one of the sides of the flexible case and engages said wedge member for moving said wedge member.

3. The locking system as defined in claim 2 further including a hinged attachment for attaching said button to said case side, said hinged attachment including means for resiliently biasing said button.

4. The locking system as defined in claim 1, wherein said means for defeating said means for biasing further comprises interengaged helically threaded male and female members.

5. A system for measuring comprising:
    a coiled tape measure;
    a flexible housing having parallel sides separated by a wall to contain said coiled tape measure;
    bias means for restoring said coiled tape measure to a coiled state within said housing;
    a tape measuring locking system having:

means for pressing said tape measure outwardly against the inside of the case wall of said housing;

means for biasing said means for pressing said tape outwardly against the inside of the case wall of said housing;

means for defeating said means for biasing, said means for defeating said means for biasing being activated by an inward force from one of the parallel sides of said housing;

wherein said means for defeating said means for biasing comprises at least one wedge member attached to the inside of said housing, said wedge member being constructed and arranged to engage and lift said means for pressing said tape measure against the inside wall of said housing.

6. The locking system as defined in claim 5 further including a button connected to a shaft which passes through one of the sides of the flexible case and engages said wedge member for moving said wedge member.

7. The locking system as defined in claim 6, further including a hinged attachment for attaching said button to said case side, said hinged attachment including means for resiliently biasing said buttons.

8. The locking system as defined in claim 5 wherein said means for defeating said means for biasing comprises interengaged helically threaded male and female members.

* * * * *